United States Patent Office 3,342,835
Patented Sept. 19, 1967

3,342,835
NOVEL PREPARATION OF 2-IMINO-1,3-DITHIOL-
ANES AND 2-IMINO-1,3-DITHIANES
Thomas Andrew Lies, Montgomery Township, Somerset
County, N.J., assignor to American Cyanamid Company, Stamford, Conn., a corporation of Maine
No Drawing. Filed Jan. 22, 1964, Ser. No. 339,352
13 Claims. (Cl. 260—327)

The present invention relates to a novel process for preparing 1,3-dithiolanes and 1,3-dithianes. More particularly, the invention relates to the novel cyclization of hydroxyalkyl dithiocarbamates to prepare imino-1,3-dithiolanes and imino-1,3-dithianes useful as intermediates in the preparation of imino-phosphate pesticides. In summary, the invention is concerned with a novel process for effecting ring-closure of a hydroxyalkyl dithiocarbamate which comprises: admixing a hydrogen halide with a hydroxyalkyl dithiocarbamate of the structure:

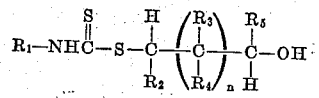

wherein $R_1$, $R_2$, $R_3$, $R_4$ and $R_5$ are each substituents selected from the class consisting of hydrogen, alkyl, and aryl, and $n$ is an integer from 0 to 1; at a temperature ranging from about 20° C. to about 80° C.

It is known that certain hydroxyalkyl dithiocarbamates can be cyclized to form either 1,3-dithiolane or 1,3-dithiane derivatives. One such method involves the use of p-toluenesulfonyl chloride in the presence of an organic solvent. Unfortunately, this method for effecting ring-closure is not entirely satisfactory, for the reason that the yields realized are low and resultant product is contaminated. In order to utilize such iminodithiolane or iminodithiane products, it is necessary to employ both lengthy and expensive purification treatments and conversion procedures. Recovery of pure product is difficult and expensive. Since the imino derivatives are valuable as intermediates in the preparation of effective imino-phosphate pesticides, it is desirable to provide a process for their preparation whereby the shortcomings of the prior practice are substantially obviated.

It is a principal object of the present invention to provide a process for the preparation of both 2-imino-1,3-dithiolanes and 2-imino-1,3-dithianes in good yield and purity. It is a further object of the invention to provide a process wherein the cyclization of hydroxyalkyl dithiocarbamates is carried out in either an inorganic or organic medium in the substantial absence of contaminants. Other objects and advantages will become apparent from a consideration of the ensuing description.

According to the process of the invention, it has been surprisingly found that the cyclization of an hydroxyalkyl dithiocarbamate can be carried out in the presence of a hydrogen halide as a ring-closing reagent. The latter may either be present in the form of an aqueous or alcoholic solution. Ring-closure is usually carried out under atmospheric conditions and at temperatures ranging from about 20° C. to about 80° C.

The over-all reaction wherein cyclization occurs can be graphically described as follows:

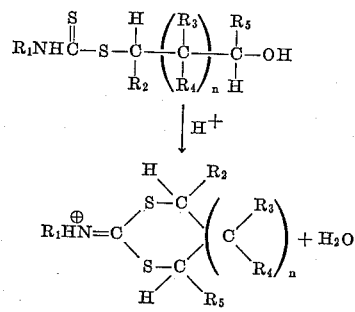

wherein $R_1$, $R_2$, $R_3$, $R_4$ and $R_5$ are each hydrogen, alkyl or aryl; and $n$ is an integer from 0 to 1.

In general, the hydroxyalkyl dithiocarbamates cyclized herein can be prepared by reacting a haloalkanol with ammonium dithiocarbamate or an alkylammonium alkyldithiocarbamate. Illustratively, the compounds to be cyclized include:

2-hydroxyethyl dithiocarbamate,
2-hydroxyethyl isopropyldithiocarbamate,
2-hydroxypropyl dithiocarbamate,
2-hydroxydodecyl dithiocarbamate,
3-hydroxypropyl dithiocarbamate,
2-hydroxy-1-methylpropyl dithiocarbamate, and
2-hydroxyphenethyl isopropyldithiocarbamate.

As the ring-closing reagent contemplated herein, hydrogen chloride, hydrogen bromide, hydrogen fluoride, hydrogen iodide or any equivalent thereof can be employed. However, it is found that hydrogen chloride is the preferred ring-closing reagent in view of its ready availability and its relatively low cost. Usually from 1 to 3 mols of the ring closing reagent per mol of the dithiocarbamate will be sufficient for good results.

The hydrogen halide cyclization reagent can be admixed with either water, an alkanol or a mixture of the two. Ring-closure occurs in good yields and in the absence of deleterious impurities, particularly when ring-closure occurs while treating the dithiocarbamate at a temperature between about 20° C. and 80° C. In general, for optimum results temperatures between 20° C. and 30° C. are employed when cyclizing 2-hydroxyalkyl dithiocarbamates in an aqueous medium. In an alcoholic medium a temperature between 50° C. and 80° C. is preferred, whereas for the cyclization of 3-hydroxy alkyl dithiocarbamates in any medium a temperature between 50° C. and 70° C. is optimal. Advantageously, resultant cyclized iminodithiolane or iminodithiane can immediately be utilized in the absence of further purification.

In order to facilitate a further understanding of the invention, the following examples are presented primarily for the purpose of illustrating certain more specific details thereof. The scope of the invention is not to be deemed limited thereby, except as defined in the claims. Unless otherwise stated, all parts are by weight and the analyses are in percent.

Example 1

To a suitable reaction vessel containing 2.1 parts of 2-hydroxyethyl isopropyldithiocarbamate are added 50 parts by volume of absolute ethanol. The resultant mixture is ice-cooled and saturated with anhydrous hydrogen chloride. The mixture is then allowed to stand for twenty-three hours at room temperature and is next concentrated by the evaporation of the solvent. Resultant gummy mass is then treated with ether. After about sixteen hours, the ether is decanted and a partially crystalline residue is dissolved in water. The aqueous solution is then filtered and thereafter neutralized with sodium hydroxide. Resultant oil is then extracted with ether. The dried ethereal solution is concentrated on a steam bath yielding crude 2-isopropylimino-1,3-dithiolane in a 69% yield. The product has the following analysis in percent:

Calculated: C, 44.7; H, 6.9; S, 39.8. Found: C, 44.4; H, 7.0; S, 39.9.

In lieu of the alcoholic hydrogen chloride employed in this example, hydrogen chloride can be injected into an ether solution of the hydroxyethyl isopropyldithiocarbamate to effect a similar cyclization.

Example 2

A solution of one part of 2-hydroxyethyl dithiocarbamate in 30 parts by volume of a saturated solution of hydrogen chloride in absolute ethanol is allowed to stand at room temperature for seventeen hours. Resultant solution is concentrated on a steam bath. To the so-concentrated solution is next added 25 parts by volume of absolute ethanol. The mixture is next evaporated to yield a dry solid residue which is triturated with acetone yielding 88% of solid 2-imino-1,3-dithiolane hydrochloride having a melting point equal to 213° C. to 216° C. with decomposition.

Example 3

A solution of 4.1 parts of 2-hydroxyethyl dithiocarbamate in 5.1 parts by volume of concentrated hydrochloric acid is permitted to stand at room temperature for seventeen hours. The solution is next diluted with about 200 parts by volume of acetone and cooled. A precipitate of colorless crystalline 2-imino-1,3-dithiolane hydrochloride is obtained in 71% yield having a melting point (with decomposition) between about 210° C. and 214° C.

Example 4

To a suitable reaction vessel containing 6.0 parts of 2-hydroxypropyl dithiocarbamate are added 11 parts of a saturated solution of hydrogen chloride in absolute ethanol at about 25° C. The resultant solution is allowed to stand at room temperature for nineteen hours and is then filtered and concentrated in vacuo. Residue is mixed with 100 parts by volume of acetone and the mixture is cooled. Resulting colorless precipitate of 2-imino-4-methyl-1,3-dithiolane hydrochloride, having a melting point equal to 161° C. to 169° C., is filtered, washed with acetone and dried in vacuo.

Example 5

Two parts of 2-hydroxydodecyl dithiocarbamate are dissolved in 30 parts by volume of a saturated solution of hydrogen chloride in absolute ethanol. The reaction mixture is allowed to stand overnight (16 hours) at room temperature. The solution is next heated at reflux for one hour, cooled to room temperature and filtered to remove ammonium chloride. The filtrate is next concentrated to leave a solid residue, which is recrystallized from acetone to yield 28.6% of 2-imino-4-n-decyl-1,3-dithiolane hydrochloride having a melting point equal to 114° C. to 117° C. and analyzing in percent as follows:

Calculated: C, 52.75; H, 8.86; N, 4.73; S, 21.67; Cl, 11.98. Found: C, 52.82; H, 8.68; N, 4.99; S, 21.63; Cl, 12.01.

Example 6

A mixture of 2 parts of 3-hydroxypropyl dithiocarbamate and 3 parts by volume of concentrated hydrochloric acid (Sp. G. 1.19) contained in a suitable reaction vessel is stirred at 50° C. for five hours, and the reaction mixture is then concentrated at about 20 mm. Hg at 40° C. The residue is treated with 10 parts by volume of acetone and the precipitate is collected. Solid residue, identified as 2-imino-1,3-dithiane hydrochloride, has a melting point equal to 167° C. to 174° C. (with decomposition) and is obtained in a 54% yield.

Example 7

A solution of 2 parts of 2-hydroxy-1-methylpropyl dithiocarbamate in 20 parts by volume of a saturated solution of hydrogen chloride in absolute ethanol is allowed to stand at 25° C. for seventeen hours. The mixture is cooled and filtered. The filtrate is concentrated in vacuo and absolute ethanol is next added (50 parts by volume). The mixture is evaporated again in vacuo and resultant residue is triturated with 100 parts by volume of acetone to precipitate 0.5 part or 22.5% of theoretical of 2-imino-4,5-dimethyl-1,3-dithiolane hydrochloride having a melting point between about 173° C. and 175.5° C. with decomposition.

Similar results are obtained when utilizing anhydrous hydrogen bromide in lieu of the anhydrous hydrogen chloride employed in Example 7 above.

I claim:
1. A process for effecting ring-closure of a hydroxyalkyl dithiocarbamate which comprises: admixing a hydrogen halide with a hydroxyalkyl dithiocarbamate of the structure:

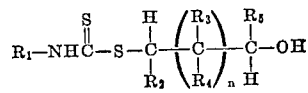

wherein $R_1$, $R_2$, $R_3$, $R_4$ and $R_5$ are each substituents selected from the class consisting of hydrogen, alkyl and aryl, and $n$ is an integer from 0 to 1; at a temperature ranging from about 20° C. to about 80° C.

2. A process according to claim 1, wherein the hydrogen halide is hydrogen chloride.

3. A process according to claim 1, wherein the hydrogen halide is hydrogen bromide.

4. A process according to claim 1, wherein the hydrogen halide is present in an inert, non-aqueous menstruum.

5. A process according to claim 1, wherein the hydrogen halide is present in an alcoholic medium.

6. A process according to claim 1, wherein the hydrogen halide is present in an aqueous medium.

7. A process according to claim 1, wherein the hydroxyalkyl dithiocarbamate is: 2-hydroxyethyl dithiocarbamate.

8. A process according to claim 1, wherein the hydroxyalkyl dithiocarbamate is: 2-hydroxyethyl isopropyldithiocarbamate.

9. A process according to claim 1, wherein the hydroxyalkyl dithiocarbamate is: 2-hydroxypropyl dithiocarbamate.

10. A process according to claim 1, wherein the hydroxyalkyl dithiocarbamate is: 2-hydroxydodecyl dithiocarbamate.

11. A process according to claim 1, wherein the hydroxyalkyl dithiocarbamate is: 3-hydroxypropyl dithiocarbamate.

12. A process according to claim 1, wherein the hydroxyalkyl dithiocarbamate is: 2-hydroxy-1-methylpropyl dithiocarbamate.

13. A process for preparing 2-imino-1,3-dithiolanes and 2-imino-1,3-dithianes which comprises effecting a ring-closure of a hydroxyalkyl dithiocarbamate which comprises: admixing a hydrogen halide with a hydroxyalkyl dithiocarbamate of the structure:

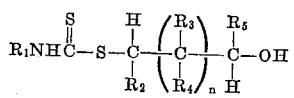

wherein $R_1$, $R_2$, $R_3$, $R_4$ and $R_5$ are each substituents selected from the class consisting of hydrogen, alkyl and aryl, and $n$ is an integer from 0 to 1; at a temperature ranging from about 20° C. to about 80° C.

References Cited

Org. Chem., vol. IX (1955), page 835.

WALTER A. MODANCE, *Primary Examiner.*

J. PATTEN, *Assistant Examiner.*